US010486800B2

(12) United States Patent
Didey

(10) Patent No.: US 10,486,800 B2
(45) Date of Patent: Nov. 26, 2019

(54) DRIVE SYSTEM FOR LANDING GEAR

(71) Applicant: AIRBUS OPERATIONS LIMITED, Bristol (GB)

(72) Inventor: Arnaud Didey, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 363 days.

(21) Appl. No.: 15/021,296

(22) PCT Filed: Sep. 8, 2014

(86) PCT No.: PCT/GB2014/052714
§ 371 (c)(1),
(2) Date: Mar. 11, 2016

(87) PCT Pub. No.: WO2015/040364
PCT Pub. Date: Mar. 26, 2015

(65) Prior Publication Data
US 2016/0221669 A1    Aug. 4, 2016

(30) Foreign Application Priority Data
Sep. 18, 2013  (GB) .................................. 1316607.9

(51) Int. Cl.
*B64C 25/40*    (2006.01)
*B64C 25/34*    (2006.01)

(52) U.S. Cl.
CPC ............ *B64C 25/405* (2013.01); *B64C 25/34* (2013.01); *Y02T 50/823* (2013.01)

(58) Field of Classification Search
CPC ......... B64C 25/00; B64C 25/02; B64C 25/18; B64C 25/24; B64C 25/34; B64C 25/40;
(Continued)

(56) References Cited

U.S. PATENT DOCUMENTS 277,802 A * 5/1883 Stanley .................. F16H 55/10
74/465
2,472,641 A * 6/1949 Wood ...................... B64C 25/38
244/100 C
(Continued)

FOREIGN PATENT DOCUMENTS

WO    2011023505 A2    3/2011
WO    2011073587 A1    6/2011
(Continued)

OTHER PUBLICATIONS

International Search Report and Written Opinion in International Application No. PCT/GB2014/052714, dated Jan. 8, 2015.

*Primary Examiner* — Richard R. Green
*Assistant Examiner* — Brady W Frazier
(74) *Attorney, Agent, or Firm* — Nixon & Vanderhye P.C.

(57) ABSTRACT

The invention relates to a drive system for rotating a wheel of an aircraft landing gear. The drive system includes a motor operable to rotate a drive pinion, and a driven gear adapted to be mounted to the wheel. The drive system has a first configuration in which the drive pinion is capable of meshing with the driven gear to permit the motor to drive the driven gear and a second configuration in which the drive pinion is not capable of meshing with the driven gear. The drive system further includes a lock-stay including a first lock link and a second lock link pivotally connected to the first lock link, the lock-stay being switchable between a first position, a second position, and an intermediate position between the first and second positions in which the first and second lock links are substantially aligned. The lock-stay is in the first position when the drive system is in the first configuration and the lock-stay is in the second position when the drive system is in the second configuration. Also, an aircraft landing gear including a wheel and the drive (Continued)

system according in which the driven gear is mounted to the wheel.

32 Claims, 9 Drawing Sheets

(58) Field of Classification Search
CPC .. B64C 25/405; B64D 2205/00; Y02T 50/823
USPC .................................................. 244/50, 103 S
See application file for complete search history.

(56) References Cited

U.S. PATENT DOCUMENTS

| | | | | |
|---|---|---|---|---|
| 3,762,670 | A * | 10/1973 | Chillson | B64C 25/36 180/301 |
| 3,850,389 | A * | 11/1974 | Dixon | B64C 25/40 244/103 S |
| 5,247,847 | A * | 9/1993 | Gu | F16H 1/24 74/422 |
| 8,979,019 | B2 * | 3/2015 | Christensen | B64C 25/405 244/100 R |
| 2006/0065779 | A1 | 3/2006 | McCoskey et al. | |
| 2007/0284939 | A1* | 12/2007 | Charles | B60T 1/10 303/152 |
| 2010/0012779 | A1* | 1/2010 | Collins | B64C 25/12 244/102 R |
| 2011/0233327 | A1* | 9/2011 | Mellor | B64C 25/34 244/102 A |
| 2012/0153075 | A1* | 6/2012 | Wilson | B64C 25/405 244/50 |
| 2012/0217340 | A1* | 8/2012 | Essinger | B64C 25/405 244/50 |
| 2012/0228921 | A1* | 9/2012 | Essinger | B64C 25/405 301/6.2 |
| 2012/0312112 | A1* | 12/2012 | Tizac | B64C 25/405 74/354 |
| 2013/0200210 | A1 | 8/2013 | Oswald et al. | |
| 2013/0299633 | A1* | 11/2013 | Tierney | B64C 25/26 244/102 SL |
| 2014/0061372 | A1* | 3/2014 | Briancourt | B64C 25/36 244/50 |
| 2014/0225421 | A1* | 8/2014 | Oswald | B64C 25/405 301/6.2 |

FOREIGN PATENT DOCUMENTS

| | | |
|---|---|---|
| WO | 2011073590 A1 | 6/2011 |
| WO | 2011134503 A1 | 11/2011 |
| WO | 2012171589 A1 | 12/2012 |

* cited by examiner

DRIVE SYSTEM FOR LANDING GEAR

RELATED APPLICATIONS

The present application is a National Phase of International Application Number PCT/GB2014/052714, filed Sep. 8, 2014, which claims priority from Great Britain Application Number 1316607.9, filed Sep. 18, 2013.

BACKGROUND OF THE INVENTION

The present invention relates to a drive system for rotating one or more wheels of an aircraft landing gear for the purposes of ground taxiing (forwards or reverse) and/or wheel spin-up prior to landing and/or for applying braking torque to the rotating wheel(s).

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power.

This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations. There is also a desire to use such a drive system to pre-spin the wheels prior to landing, so that the wheels are already spinning at, or near, their initial landing speed on touch down. Such pre-landing spin-up is perceived to reduce tyre wear on landing, and reduce loads transmitted to the landing gear during landing.

Several autonomous ground taxi systems for both driving the wheels while the aircraft is on the ground and spinning them up prior to landing have been proposed in recent years. An example is disclosed in US2006/0065779, which proposes a powered nose aircraft wheel system in which a clutch is used to switch between a mode in which the wheel can spin freely and a mode in which the wheel can be driven by an electric motor. The clutch can also operate to enable the motor to pre-spin the wheel prior to landing.

A prior art arrangement which is not restricted to nose landing gears is described in WO2011/023505. The disclosed system uses an actuator to move a pinion gear in and out of driving engagement with a ring gear mounted to the wheel hub.

SUMMARY OF THE INVENTION

A first aspect of the invention provides a drive system for rotating a wheel of an aircraft landing gear, the drive system including a motor operable to rotate a drive pinion, and a driven gear adapted to be mounted to the wheel, wherein the drive system has a first configuration in which the drive pinion is capable of meshing with the driven gear to permit the motor to drive the driven gear and a second configuration in which the drive pinion is not capable of meshing with the driven gear, the drive system further comprising a lock-stay including a first lock link and a second lock link pivotally connected to the first lock link, the lock-stay being switchable between a first position, a second position, and an intermediate position between the first and second positions in which the first and second lock links are substantially aligned, wherein the lock-stay is in the first position when the drive system is in the first configuration and the lock-stay is in the second position when the drive system is in the second configuration.

A further aspect of the invention provides an aircraft landing gear having a wheel and a drive system according to the first aspect, wherein the driven gear is mounted to the wheel.

The term "wheel" of the aircraft landing gear is used here in its conventional sense to refer to a ground wheel which contacts the ground surface when the aircraft is supported by the ground and is not airborne. The term "lock-stay" is used here to refer to a stay, or brace, which is locked in at least one position. The term "lock link" is used here to refer to a linkage element, e.g. an arm or bar, of the lock-stay. The lock-links of the lock-stay are pivotally connected to form an elbow joint. The intermediate position of the lock-stay is a "centre" position in which the lock-links are substantially aligned, i.e. an imaginary line between opposite ends of the lock-stay passes through the pivotal connection between the lock-links. The lock-stay articulates about the pivotal connection (the elbow joint). Since the degree of articulation of the lock-stay enables movement through the intermediate (or central) position, the lock-stay is of a type commonly known as an over-centre lock-stay. The lock-stay is lockable in either the first position, the second position or both the first position and the second position. The term "lock" is used here to refer to a limit of articulation of the lock-stay about the pivotal connection (the elbow joint). The feature limiting the articulation of the lock-stay may be a feature of the lock-stay per se or alternatively may be a feature of a component or mechanism coupled to the lock-stay.

The term "motor" is used here in its conventional sense to refer to a machine whereby some source of energy (e.g. electric, pneumatic, hydraulic, etc.) is used to give motion. It is to be understood that the motor may be a motor-generator, which, in addition to its function as a motor, is operable as a generator whereby mechanical energy is converted into electrical energy. The terms "drive" and "driven" are used here with reference to the "drive pinion" and the "driven gear" refer to convey the sense of power transfer when the motor is operable to rotate the wheel of the aircraft landing gear. It will, of course, be appreciated that where the motor is a motor-generator and is acting as a generator the "driven gear" will in fact be the driving element which drives the "drive pinion" and therefore the generator. The generator may be used to apply a braking torque to the wheel.

The lock-stay may have a first end and a second end, the first end having a pivotal connection with a pivot axis spaced at a fixed distance from an axis of rotation of the driven gear, and the second end having a pivotal connection with a pivot axis spaced at a fixed distance from an axis of rotation of the drive pinion.

The limit(s) of articulation of the lock-stay may be dictated by the centre distances of the drive pinion and the driven gear. For example, the second position may correspond to a limit of articulation of the lock-stay at which a running clearance between the drive pinion and the drive gear can be ensured. The first position may correspond to a limit of articulation of the lock-stay at which a maximum permitted thrust load may be experienced at the meshing interface of the drive pinion and the drive gear.

The drive system may further comprise an actuator coupled to the lock-stay for moving the lock-stay between the first and second positions.

The actuator may be a linear actuator.

The linear actuator may have a first end and a second end, the first end being pivotally connected to the pivotal connection between the first lock link and the second lock link. Coupling the linear actuator to the pivotal connection between the lock links provides mechanical advantage in moving the lock-stay between the first and second positions, and also provides simplicity as the coupling between the linear actuator and the lock-stay can make use of a common pivot joint which may reduce part count and lead to weight and cost savings. Alternatively, the linear actuator may be coupled to any part of the lock-stay between the ends of the lock-stay. The second end of the linear actuator may be coupled to any part of the drive system, or any part of the landing gear to which the drive system is mounted, which is fixed, i.e. does not move relative to the wheel axis of rotation.

The actuator may alternatively be a rotary actuator. The rotary actuator may disposed at one end of the lock-stay, or alternatively may be disposed at the pivotal connection between the lock links of the lock-stay.

The actuator may be a back-driveable actuator. A back-driveable actuator is one which can be driven by an externally applied load.

The actuator may include a failsafe locking device. A failsafe locking device is a locking device within the actuator which engages to prevent movement of the actuator in the event of some failure in the actuator or a control system which controls the actuator. The locking device may be adapted to engage only when the actuator is in a predetermined position, e.g. when the actuator is in the second position so as to maintain the drive system in the second configuration whereby the drive pinion is not capable of meshing with the driven gear.

The drive system may further comprise a biasing element coupled to the lock-stay for biasing the lock-stay to the second position. The biasing element may include at least one spring. The spring may be a helical coil spring wound around the linear actuator. Alternatively, springs may be disposed on either side of the actuator. The springs may be tension springs where the actuator is arranged to be in a retracted state when the lock-stay is in the second position and in an extended state when the lock-stay is in the first position.

The lock-stay may include a first locking finger, and in the first position the locking finger provides a stop to limit rotation of the first lock link relative to the second lock link about the pivotal connection.

The lock-stay may include a second locking finger, and in the second position the locking finger provides a stop to limit rotation of the first lock link relative to the second lock link about the pivotal connection.

The drive system according may further comprise a mechanism for moving the drive system between the first and second configurations, wherein the mechanism is a four bar linkage comprising a ground link, a first grounded link coupled to the ground link by a first revolute joint, a second grounded link coupled to the grounded link by a second revolute joint, and a floating link coupled to the first and second grounded links by third and fourth revolute joints respectively, and wherein the lock-stay provides the floating link and the first grounded link of the four bar linkage.

The second revolute joint of the four bar linkage may be spaced at a fixed distance from an axis of rotation of the driven gear and is also spaced at a fixed distance from an axis of rotation of the drive pinion.

The ground link may comprise a mounting bracket for fixing to the landing gear. Alternatively, the ground link may be a fitting of the landing gear structure. Where the lock-stay actuator is a linear actuator the linear actuator may be coupled between the ground link and the lock-stay.

The drive system may further comprise a drive path between the motor and the drive pinion. The drive path may include an input shaft and an output shaft. The drive pinion may be mounted on the output shaft.

The drive path may include a reduction gear arrangement between the input shaft and the output shaft.

The reduction gear arrangement may be housed within a housing and the lock-stay may be pivotally connected to the housing.

The input shaft may be coaxial with the output shaft. In such an arrangement the drive path may include an epicyclic reduction gear arrangement.

The input shaft may have an axis of rotation spaced from an axis of rotation of the output shaft. The output shaft may be operable to pivot about the axis of rotation of the input shaft. In such an arrangement the input shaft may be coaxial with an axis of rotation of the motor, i.e. the rotor axis of the motor. The motor axis of rotation may be fixed with respect to an axis of rotation of the driven gear. In other words the motor may be grounded such that the motor axis of rotation is spaced fixed with respect to the ground link or the bracket. The motor (i.e. the motor housing) may be fixed to the bracket such that the motor housing does not rotate with respect to the bracket. Alternatively, the motor housing may be arranged to rotate with respect to the bracket about the rotor axis as the drive system moves between the first and second configurations.

The lock-stay may be adapted for movement between the first and second positions in a substantially vertical plane. Preferably, the second position is below the first position. In this way the effects of gravity (when the aircraft is on the ground) may assist with movement of the drive system to the second configuration where the drive pinion and driven gear are disengaged.

The drive system may further comprise an isolating device for fixing the lock-stay in the second position. The isolating device may be a removable locking pin which, when installed, prevents rotation of the lock links. The lock links may each have an aperture arranged such that the apertures are aligned when the lock-stay is in the second position and capable of receiving the locking pin. The isolating device may be used during maintenance or in any situation when the drive system is not required to be operable.

One of the drive pinion and the driven gear may include a sprocket, and the other of the drive pinion and the driven gear may include a roller gear (a.k.a. a "pin gear"). The sprocket is arranged to mesh with the roller gear. The roller gear may be replaced with a roller chain. The drive pinion and the driven gear may alternatively comprise toothed gears such as spur gears or the like.

The driven gear is adapted to be mounted to a hub of the wheel. In particular the driven gear may be mounted to a rim of the hub provided at the outer diameter of the hub.

BRIEF DESCRIPTION OF THE DRAWINGS

Embodiments of the invention will now be described with reference to the accompanying drawings, in which.

DETAILED DESCRIPTION OF EMBODIMENT(S)

A first embodiment of the invention is shown in FIGS. 1 to 5. In the illustrated embodiment the landing gear has two wheels, but the principles of the embodiment may be applied to landing gear with four or more wheels. The embodiment shows a main landing gear (i.e. a landing gear attached to wing structure or fuselage structure in the region of the wings), since the weight supported by the main landing gear is considered to provide the best traction between the wheels and the ground to enable reliable aircraft ground taxiing. However, the drive system of the present invention may alternatively be applied to a nose landing gear (i.e. a steerable landing gear towards the nose of the aircraft). The main landing gear shown is applicable to a single aisle passenger airliner (approximately 150-200 pax), although it will be appreciated that this invention has wide applicability to a variety of aircraft types and weights, including civil aircraft, military aircraft, helicopters, passenger aircraft (<50 pax, 100-150 pax, 150-250 pax, 250-450 pax, >450 pax), freighters, tilt-rotor aircraft, etc.

Figure 1:
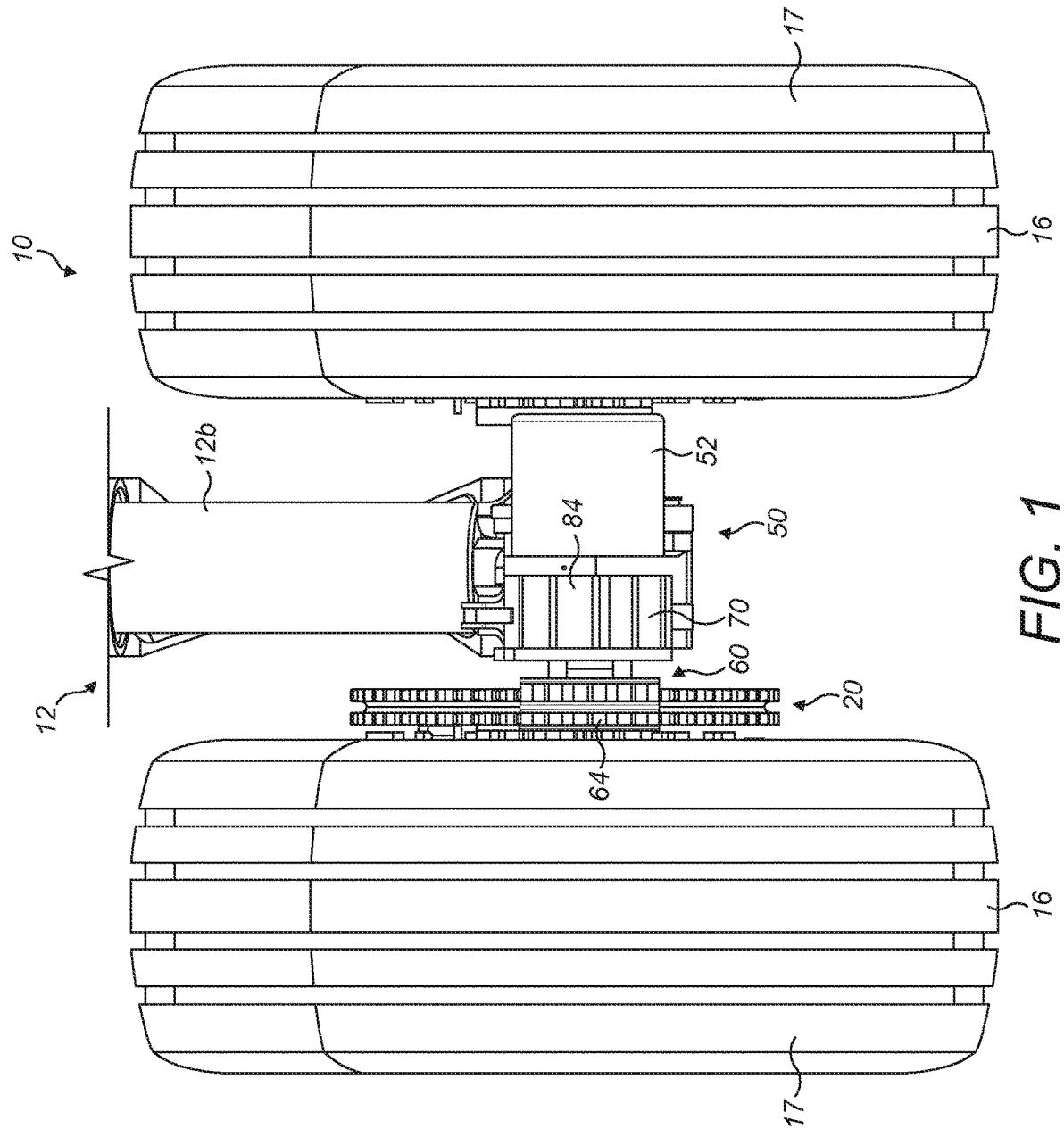
FIG. 1 shows a rear view of an aircraft landing gear having a drive system according to a first embodiment.
Figure 2:
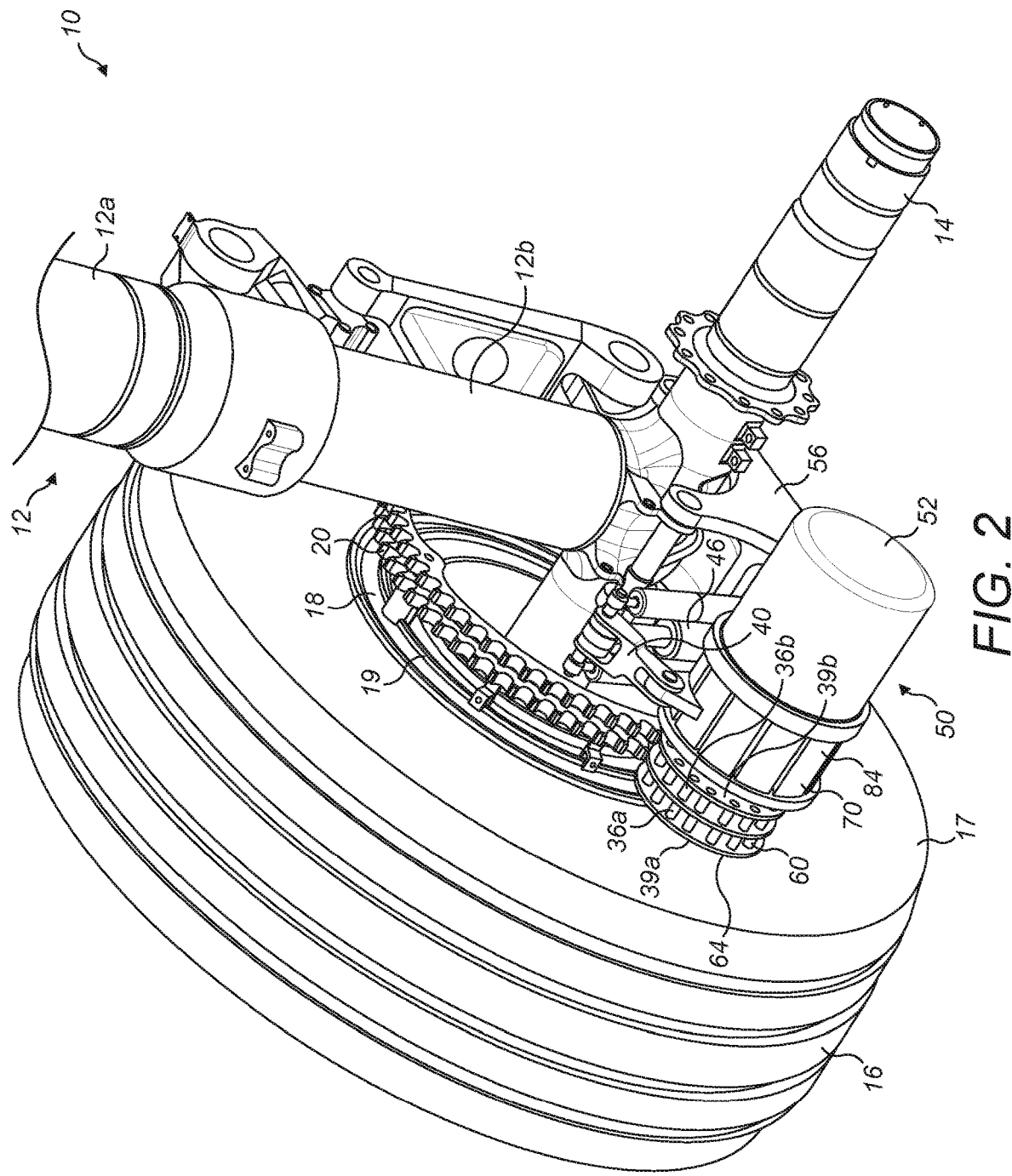
FIG. 2 shows an isometric view of the drive system of FIG. 1.
Figure 3:
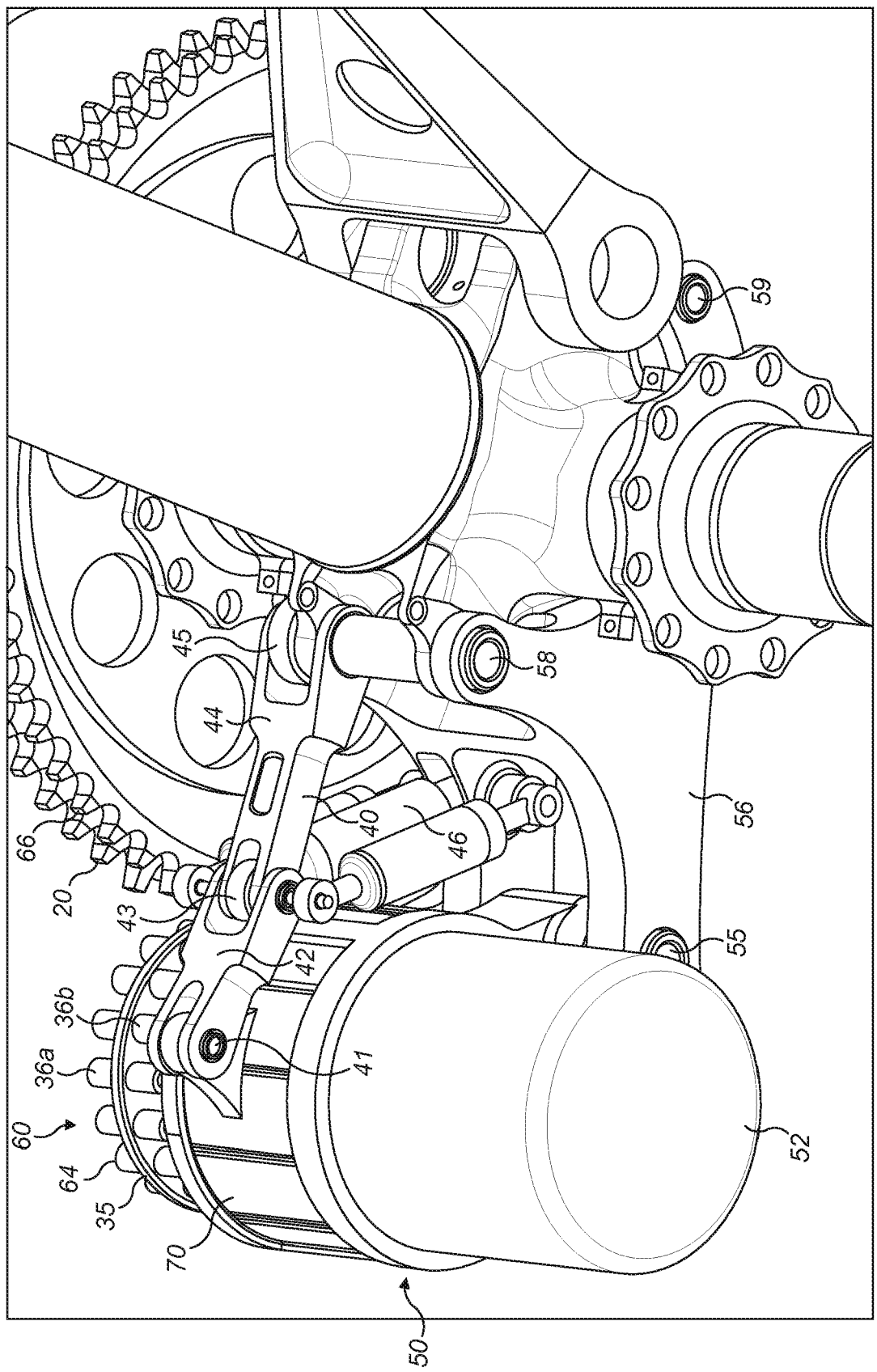
FIG. 3 shows a detailed isometric view of the drive system of FIG. 1.

The landing gear 10 includes a telescopic shock-absorbing main leg 12, including an upper telescopic part 12a (main fitting) and a lower telescopic part 12b (slider). The upper telescopic part 12a is attached to the aircraft fuselage or wing (not shown) by its upper end (not shown). The lower telescopic part 12b supports an axle 14 carrying a pair of wheels 16, one on either side of the main leg, (only one wheel 16 is shown in FIG. 2, for clarity. The wheels 16 are arranged to rotate about the axle 14 to enable ground movement of the aircraft, such as taxiing or landing.

Each wheel 16 comprises a tyre 17 supported by a hub 18. Each wheel hub 18 has a rim 19 for holding the tyre. The wheel drive system 50 includes a driven gear 20 attached to the hub 18 so as to be rotatable with the wheel 16. In the illustrated embodiment the driven gear 20 comprises a sprocket 66 which is a wheel-type sprocket having two coaxial rings of radially-extending sprocket teeth. The sprocket-to-hub interface may be a rigid attachment or alternatively may include a flexible interface to permit some angular deflection of the sprocket with respect to the wheel hub to accommodate deflections of the landing gear structure.

The drive system 50 further comprises a motor 52 which is configured to rotate a drive pinion 60 via a gearbox 70. The drive pinion 60 is a roller gear 64 formed by a rigid annular ring 35 and a series of pins (not shown) projecting from both sides of the annular ring 35, A first series of rollers 36a rotatably supported by the pins is provided on one side of the annular ring 35, and a second series of rollers 36b rotatably supported by the pins is provided on the other side of the annular ring. Each series of rollers 36a, 36b extend around the annular ring to form a continuous track. First and second lateral annular rings 39a, 39b sandwich the first and second series of rollers 36a, 36b. The pins supporting the first series of rollers 36a extend between the annular ring 35 and the first lateral annular ring 39a, and the pins supporting the second series of rollers 36b extend between the annular ring 35 and the second lateral annular ring 39b. The annular ring 35 therefore forms a central spine for supporting the pins which are cantilevered off the central spine.

In the first embodiment the gearbox 70 is an epicyclic reduction gearbox which provides a drive path between the motor 52 and the drive pinion 60. The motor is an electric motor which drives an input shaft of the drive path. An output shaft of the drive path is coaxial with the input shaft and is also coaxial with the axis of rotation of the motor. The drive pinion 60 is mounted on the output shaft. The output shaft may have a crowned spline or barrel spline at the mounting location of the drive pinion 60 to accommodate angular degree of freedom for the drive pinion 60 to cope with deflections of the landing gear, particularly axle deflections.

The gearbox 70 has a housing 84 to which the motor 52 is fixed on one side and from which the output shaft having the drive pinion 60 projects on the opposite side. The lower part of the housing 84 has a projecting lug which is pivotally connected at 55 to a mounting bracket 56. The mounting bracket is fixedly attached to the axle 14 at the base of the slider 12b, The mounting bracket 56 extends beneath the axle 14 is attached by mounting pin 58, 59 to aft and fore mounting points respectively on the axle 14. The mounting pins 58, 59 permit ready detachment of the bracket from the landing gear.

A lock-stay 40 is coupled between the bracket 56 (at the mounting pin 58) and the gearbox housing 84. The lock-stay 40 comprises a first lock-link 42 and a second lock-link 44. The first lock-link 42 has a first end pivotally connected to the gearbox housing 84 at 41 and a second end pivotally connected to the second lock-link at 43. The second lock-link has a first end pivotally connected to the first lock-link at 43 and a second end pivotally connected to the bracket 56 at 45 and shares the mounting pin 58.

The lock-stay 40 provides a mechanism for moving the drive system between a first configuration in which the drive pinion 60 is in meshing engagement with the driven gear 20 and a second configuration in which the drive pinion 60 is physically disengaged and not capable of meshing with the driven gear 20. The mechanism is a four bar linkage comprising, in a conventional manner, a ground link, a first grounded link coupled to the ground link by a first revolute joint, a second grounded link coupled to the grounded link by a second revolute joint, and a floating link coupled to the first and second grounded links by third and fourth revolute joints respectively.

The bracket 56 provides the ground link; the second lock-link 44 provides the first grounded link; the gearbox housing 84 provides the second grounded link; and the first lock-link 42 provides the floating link. Articulation of the lock-stay 40 causes the gearbox housing 84 to pivot about its pivotal connection 55 (the second revolute joint) with respect to the fixed bracket 56. This pivotal movement of the gearbox housing 84 causes the drive pinion 60 to move between its engaged and disengaged configurations with the driven gear 20.

This movement is effected by an actuator. In the first embodiment the actuator is a linear actuator 46. The linear actuator 46 is pivotally connected at one end to the bracket 56 and at its other end to the pivotal connection 43 (the third revolute joint) between the first and second lock-links of the lock-stay. The lock-stay is switchable between a first position, a second position, and an intermediate position between the first and second positions in which the first and second lock-links are substantially aligned.

Figure 4:
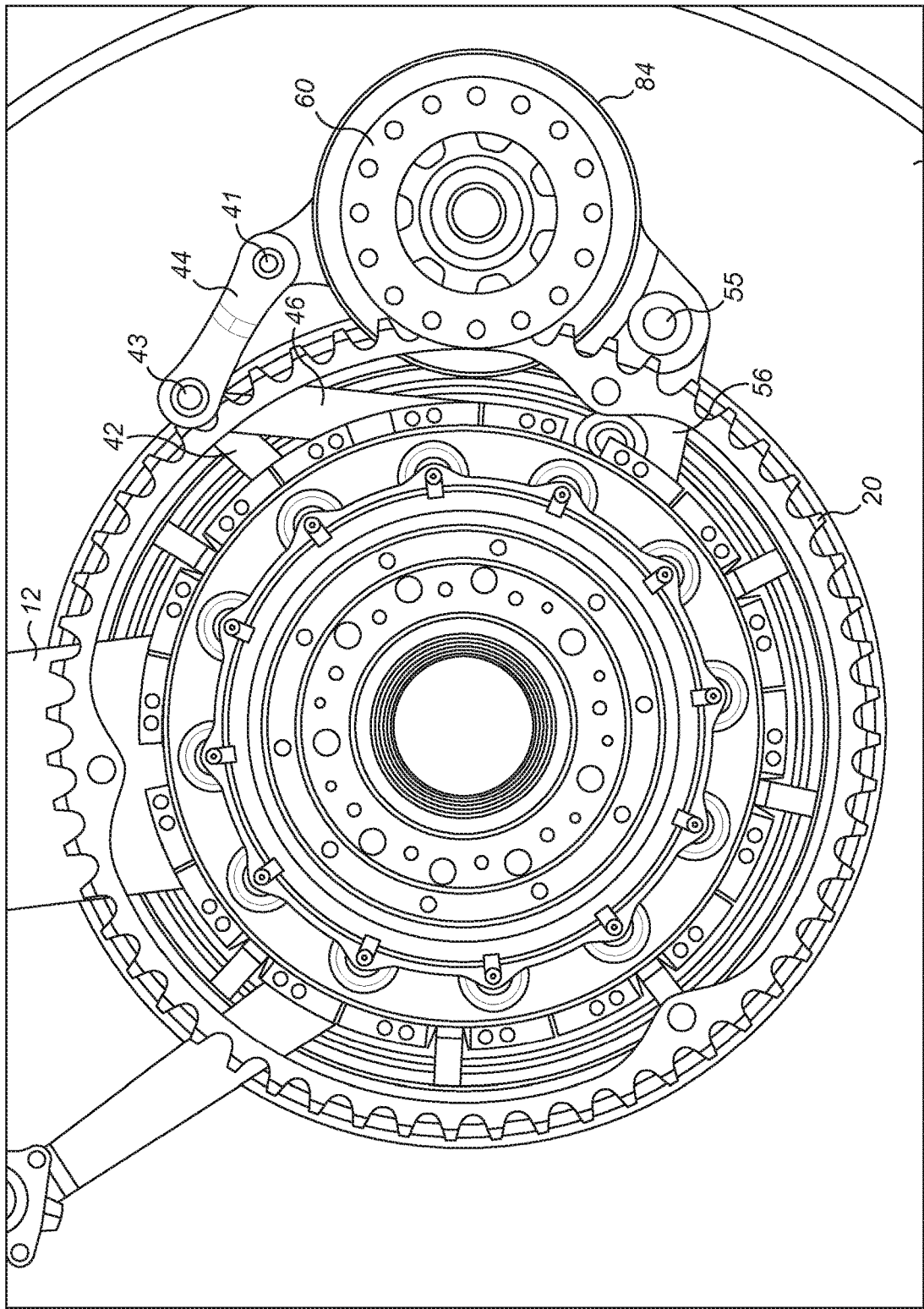
FIG. 4 shows a side view of selected components of the drive system of FIG. 1 in the engaged position.

FIG. 4 shows the lock-stay in the first position with the linear actuator 46 fully extended so as to shorten the effective length of the lock-stay between the pivotally connected ends 41 and 45 (the fourth and first revolute joints respectively of the four bar). This shortening causes the drive pinion 60 to pivot about pivotally connection 55 (the second revolute joint of the four bar) in an arc and move into meshing engagement with the driven gear 20—the first configuration of the drive system 50.

Figure 5:
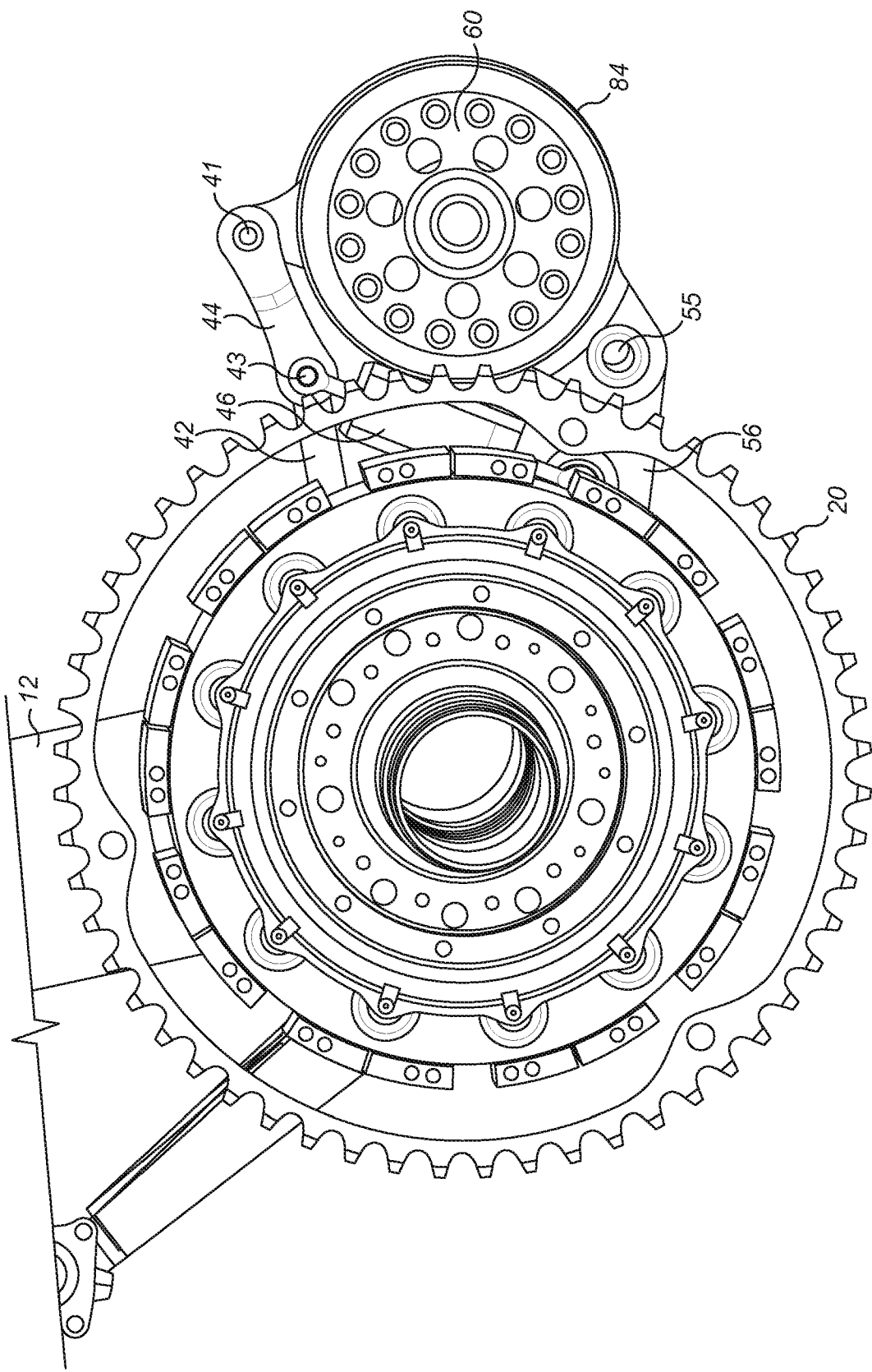
FIG. 5 shows a side view of selected components of the drive system of FIG. 1 in the disengaged position.

FIG. 5 shows the lock-stay in the second position with the linear actuator 46 fully retracted so as to lengthen the effective length of the lock-stay between the pivotally connected ends 41 and 45 (the fourth and first revolute joints respectively of the four bar). This lengthening causes the drive pinion 60 to pivot about pivotally connection 55 (the second revolute joint of the four bar) in an arc and move out of meshing engagement with the driven gear 20 to be physically separate from the driven gear 20—the second configuration of the drive system 50.

In the second position the pivotally connected ends 41 and 45 of the lock-stay are not co-linear with the pivotal connection 43 between the first and second lock-links 42, 44. Instead, in the second position the lock-stay 40 is in an over-centre state. As mentioned above the lock-stay is switchable between the first position, the second position, and the intermediate position in which the pivot points 41, 43 and 45 all lie in a straight line. The intermediate position will therefore correspond to the greatest effective length of the lock-stay 40, i.e. where the pivotally connected ends 41 and 45 are furthest apart. The external angle between the first and second lock-links (taken between points 41-43 and 43-45) will be much greater than 180 degrees in the first configuration but will be slightly less than 180 degrees in the second configuration.

The lock-stay 40 and its actuator 46 serves a dual purpose. Firstly, it serves to move the drive system 50 between the engaged (first) and disengaged (second) configurations. Secondly, it serves to lock the drive system 50 in the disengaged configuration. This is important as an un-commanded engagement of the drive system would be highly undesirable. During landing the aircraft landing gear undergoes shock loads and vibration which can lead to accelerations of up to 70 g. The drive system 50 is designed to ensure that even in these scenarios there can be no un-commanded engagement, even in failure cases such as a loss of hydraulic pressure or electrical power to the linear actuator 46.

Due to the over-centre state of the lock-stay 40 in the second position a load acting to lengthen the effective length of the lock-stay 40 will tend to bring the lock-links of the lock-stay into line. Not only does this have the effect of drawing the drive pinion 60 and the driven gear 20 further apart (thereby ensuring no meshing engagement) but the in-line, or intermediate position, of the lock-stay is where the lock-stay is best able to react to the tensile load being applied to increase the effective length of the lock-stay.

An opposite load acting to shorten the effective length of the lock-stay will be reacted by the lock-stay. As shown schematically in FIG. 7, the lock-stay 40 has a locking finger 47 near the pivot 43 which provides a stop to limit rotation of the first lock link relative to the second lock link. In the illustration the locking finger 47 is provided on the first lock link 42 and in the second position of the lock-stay 40 the locking finger 47 bears against a surface of the second lock link. This prevents further rotation of the first lock link in a clockwise direction as viewed in FIG. 7 relative to the second lock link. Of course, the locking finger 47 may alternatively be provided on the second lock link 44 so as to bear against the first lock link. The locking finger 47 extends across and above the pivot 43.

Additionally or as an alternative to the locking finger 47 the actuator 46 may have an end stop such that when the actuator is fully retracted the actuator 46 reacts the load acting to shorten the effective length of the lock-stay when in the second position.

Figure 8:
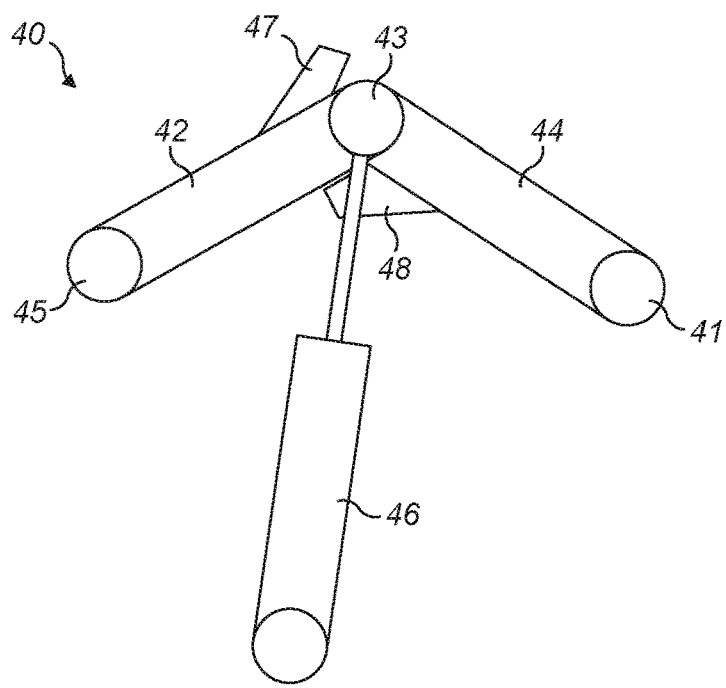
FIG. 8 shows a schematic of the lock-stay and linear actuator of the drive systems in the engaged position.

As shown in FIG. 8 the lock-stay may have a locking finger 48 near the pivot 43 which provides a stop to limit rotation of the first lock link relative to the second lock link when the lock-stay is in the first position, corresponding to the engaged configuration of the drive system 50. In the illustration the locking finger 48 is provided on the second lock link 44 and in the first position of the lock-stay 40 the locking finger 48 bears against a surface of the first lock link. This prevents further rotation of the first lock link in an anti-clockwise direction as viewed in FIG. 8 relative to the second lock link. Of course, the locking finger 48 may alternatively be provided on the first lock link 42 so as to bear against the second lock link. The locking finger 48 extends across and below the pivot 43.

Additionally or as an alternative to the locking finger 48 the actuator 46 may have an end stop to limit the full extension of the actuator 46. Limiting the extension of the actuator and/or limiting the articulation of the lock-stay when the lock-stay is in the first position ensures a minimum centre distance between the drive pinion 60 and the driven gear 20. This helps avoid excessive compressive load at the meshing interface of the drive pinion 60 with the driven gear 20 in the event of an actuator failure that could result in a runaway condition leading to an un-commanded full extension of the actuator 46.

Figure 7:
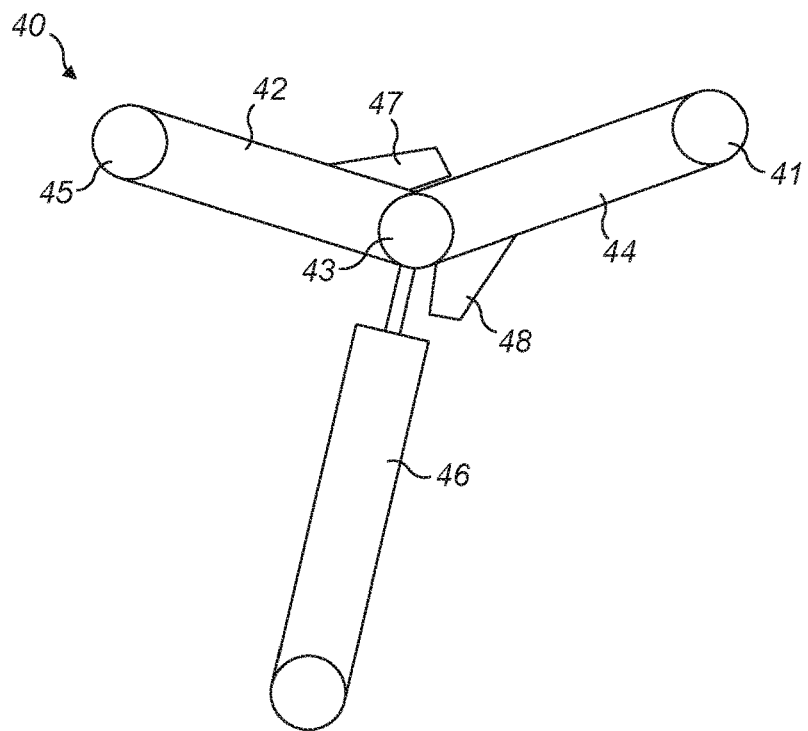
FIG. 7 shows a schematic of a lock-stay and a linear actuator for the drive systems in the disengaged position.

As shown in FIG. 7 the locking finger 48 is inactive when the lock-stay is in the first position, and as shown in FIG. 8 the locking finger 47 is inactive when the lock-stay is in the second position. The word inactive is used here to refer to an unloaded locking finger that does not bear against a surface of the opposite lock link.

Figure 9:
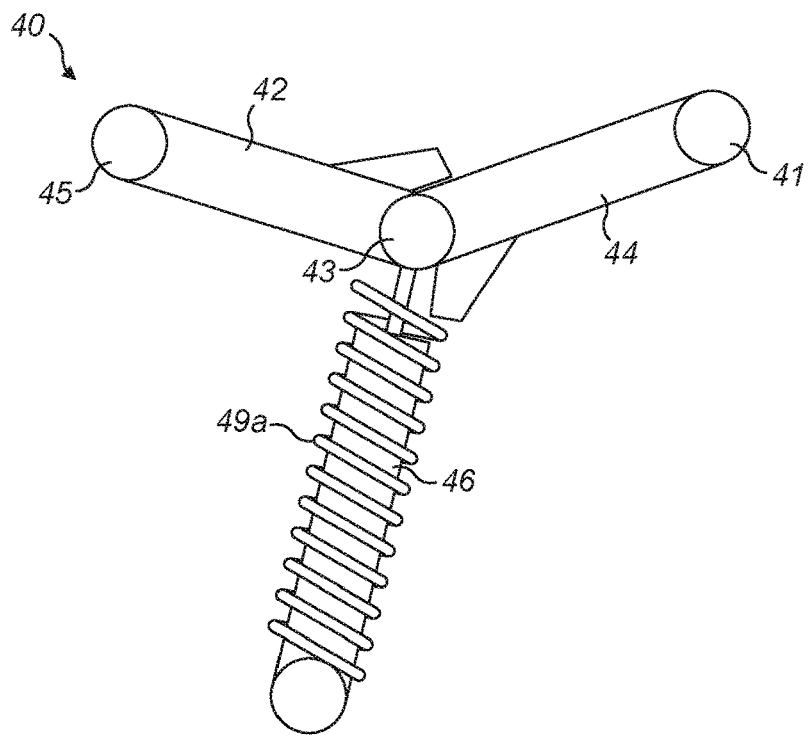
FIG. 9 shows a schematic of the lock-stay and linear actuator of FIG. 7 with an tension spring according to a first example.

It is desirable that the linear actuator 36 is a back-driveable actuator, and a biasing element is provided to bias the lock-stay 40 to the second position corresponding to the disengaged configuration of the drive system 50. In the event of an actuator or control failure the drive system is therefore failsafe and will return to the disengaged position. The biasing element can take a variety of forms. For example, as shown in FIG. 9, a single helical coil tension spring 49a may be wound around the linear actuator 46 like a bobbin and fixed at each end of the actuator. During movement of the lock-stay from the second position to the first position the actuator 46 works against the tension spring 49a, and during normal movement of the lock-stay from the first position to the second position the actuator is assisted by the tension spring 49a. Should the actuator 46 fail in anything other than the second position the actuator will revert to a back-driveable state and be driven to the second position by the tension spring 49a. In addition the lock-stay 40 is arranged to move in a substantially vertical plane whereby the second position is below the first position such that gravity will act to return the lock-stay to the second position.

Figure 10:
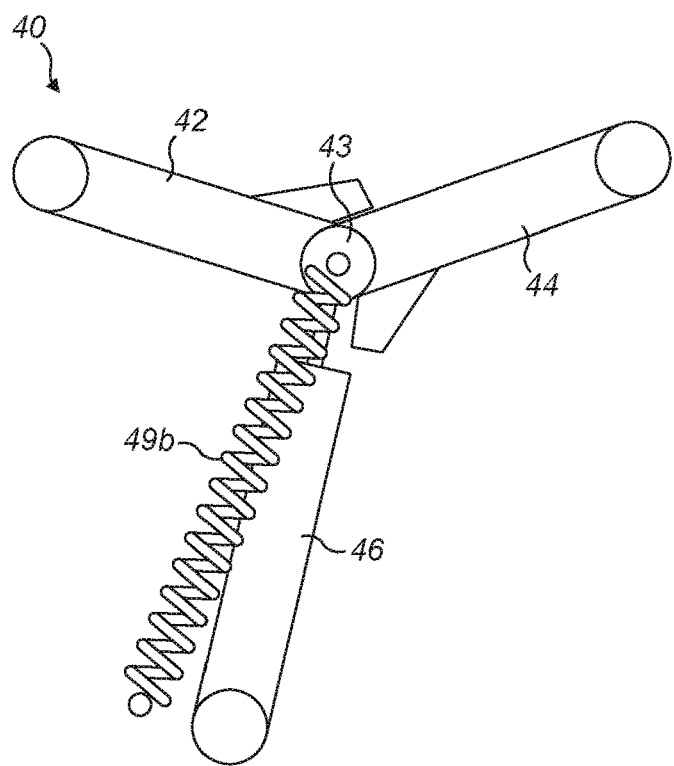
FIG. 10 shows a schematic of the lock-stay and linear actuator of FIG. 7 with an tension spring according to a second example.

The tension spring 49a being wound about the actuator 46 provides a compact package and the spring can be of a relatively large diameter. However, with only one actuator only one helical coil spring can easily be wrapped around the actuator. If additional biasing force is required to ensure failsafe operation of the drive system 50 then a plurality of helical coil tension springs may be provided, e.g. one spring on either side of the actuator. FIG. 10 illustrates one tension spring 49b coupled between the bracket 56 and the lock-stay 40 and a further tension spring 49b is provided behind the one illustrated. Any number of biasing elements may be provided.

Whilst in the illustrated embodiment the first position of the lock-stay is above the second position such that the biasing element tends to retract the actuator, it will be appreciated that in alternative embodiments the lock-stay may be inverted such that the first position is below the second position and the biasing element would then be required to extend the actuator to a failsafe condition. The biasing element may then be a compression spring or the like.

Figure 11:
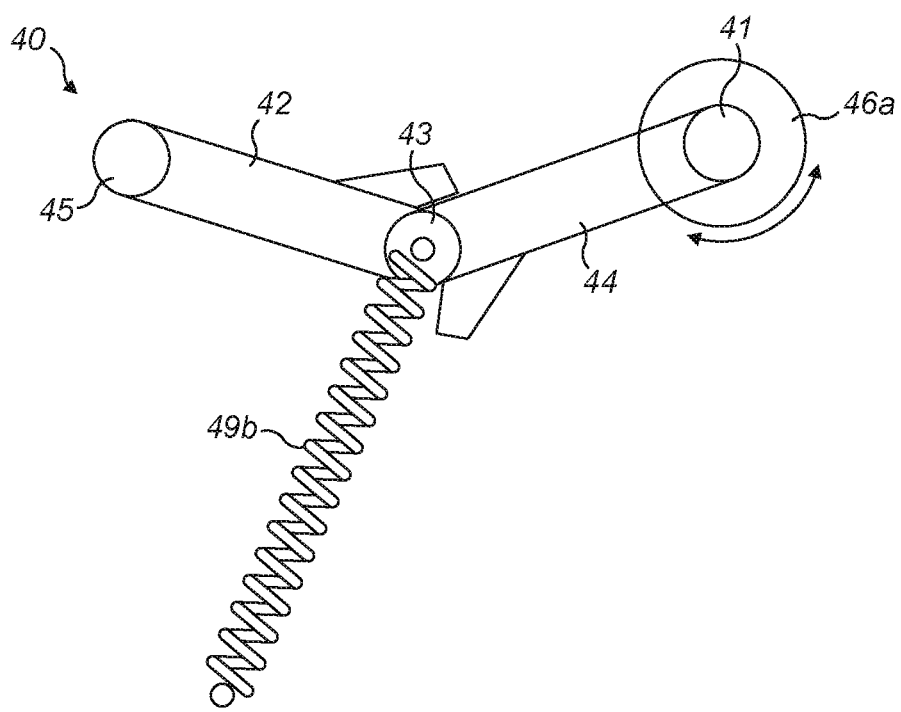
FIG. 11 shows a schematic of a lock-stay and a rotary ac or the drive systems.

FIG. 11 illustrates schematically an alternative embodiment in which the lock-stay 40 has a rotary actuator 46a instead of the linear actuator 46. The rotary actuator is provided at the pivotally connected end 41 of the lock-stay for rotating the second lock link relative to the bracket 56. The rotary actuator may alternatively be provided at pivots 43 or 45 of the lock-stay. Operation of the lock-stay 40 and the drive system 50 is identical to the embodiments described above with a linear actuator. One or more helical coil tension springs 49b may be coupled between the lock-stay and the bracket 56 for biasing the lock-stay to the second position. Alternative biasing elements such as those described above may additionally or alternatively be used.

Regardless of whether a linear or rotary lock-stay actuator is provided the actuator may include a failsafe locking device for locking the actuator when the lock-stay is in the second position corresponding to the disengaged configuration of the drive system 50. Engagement of the locking device prevents movement of the actuator and therefore prevents the drive system from moving from the disengaged configuration, thereby ensuring the drive system does not inadvertently engage. The actuator may be an hydraulic actuator or an electro-hydraulic actuator in which case the locking device may be an hydraulic lock. Alternatively the actuator may be an electro-mechanical actuator with a mechanical lock. The choice of actuator may be influenced by the type of brake assembly used for braking the landing gear wheels, e.g. an hydraulic braking system may favour an hydraulic/electro-hydraulic actuator for the wheel drive system 50. A servo valve or a motor-pump may be located near the braking system hydraulic blocks if possible.

Regardless of the type of actuator used the drive system may include a load control scheme to control the loads between the drive pinion 60 and the driven gear 20 when these are in meshing engagement in the first configuration of the drive system 50. The actuator may be force controlled using the motor torque (current) demand to comply with deflections/deformation of the final transmission between the drive pinion 60 and the driven gear 20. Force feedback/pressure feedback at the engagement interface may be used to control the actuator position in closed loop. Force feedback may not be required and the actuator may be controlled in open loop, limiting sensor requirement and improving system reliability. The load may be set as a function of the motor torque plus a margin to ensure secure meshing engagement but so as to limit wear. An actuator position sensor may be needed to confirm whether the actuator is engaged or disengaged. A rotary position sensor, such as a rotary variable differential transformer, or a linear position sensor, such as a linear variable differential transformer, embedded within the actuator may be used by the control loop of the actuator during engagement. Wheel deformation due to tyre loading (so-called wheel "ovalisation") is accommodated by the actuator load control scheme.

During engagement, the inertia (speed) of the driven gear 20 and the drive pinion 20 would be matched using available motor speed feedback (for pinion speed) and either the aircraft tachometer (not shown) or an independent driven gear speed sensor, such as an inductive sensor using the sprocket teeth as target, may be used.

Figure 6:
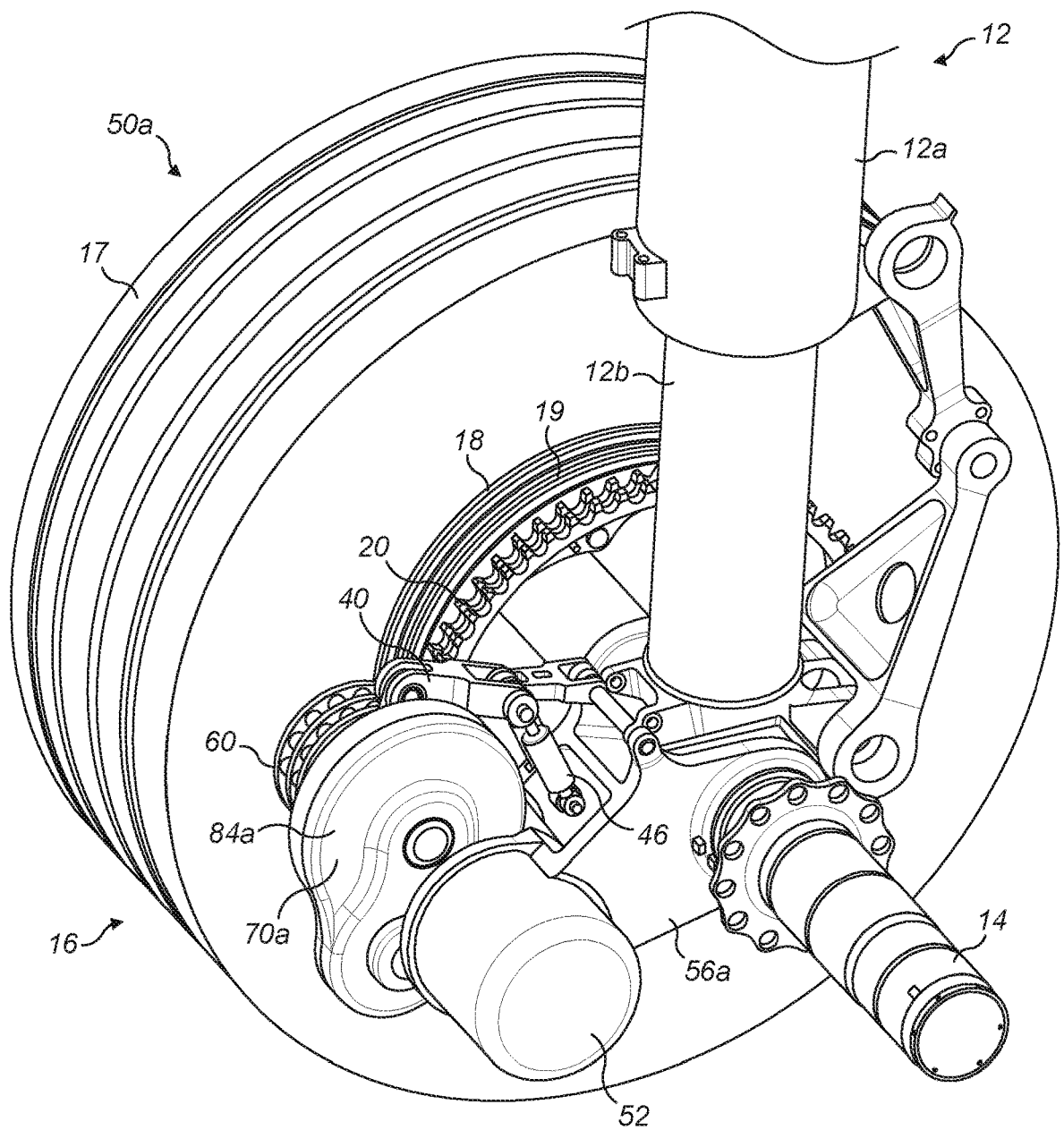
FIG. 6 shows an isometric view of a drive system according to a second embodiment.

FIG. 6 illustrates a second embodiment of the drive system 50a which is similar in many respects to the first embodiment described above. Only the differences between the first and second embodiments will be described below. Whereas in the first embodiment the motor 52 is coupled to an epicyclic gearbox 70, in the second embodiment the motor 52 is coupled to a two-stage parallel axis gearbox 70a.

The drive system 50a is supported by a bracket 56a which is rigidly connected to the axle 14 of the landing gear. The bracket 56a includes two lugs comprising half moon clamps to permit ready attachment and detachment of the bracket 56a to the axle 14. The motor 52 is fixedly connected, e.g. by bolting, to the bracket 56a. The gearbox 70a is pivotally connected to the bracket 56a at pivot lugs on each arm of the bracket 56a disposed either side of the gearbox 70a.

The gearbox 70a comprises a two stage parallel axis reduction gear transmission. The transmission comprises first, second, third and fourth cooperating spur gears. The first gear is fixed to an input shaft so that it rotates with that shaft about a first axis. The first gear is in permanent meshing engagement with the second gear rotatable about a second axis spaced from and parallel to the first axis. The third gear is mounted coaxially with the second gear for rotation about the second axis. The third gear is in permanent meshing engagement with the fourth gear fixed to an output shaft so that it rotates with that shaft. The output shaft is rotatable about a third axis spaced from and parallel with the first and second axes. The drive pinion 60 (formed as a sprocket identical to the first embodiment) is fixed to the output shaft so that it rotate with that shaft. The first, second, third and fourth gears provide a drive path between the input shaft and the drive pinion. The first and second gears provide a first reduction gear arrangement of the drive path and the third and fourth gears provide a second stage reduction gear arrangement of the drive path.

The two stage parallel axis gearbox 70*a* is encased within a housing 84*a* formed in two parts joined together. The input shaft is mounted for rotation with respect the housing 84*a* by a bush. An intermediate shaft having the second and third gears fixed thereto is mounted for rotation with respect to the housing 84*a* by bushes, and the output shaft is mounted for rotation with respect to the housing 84*a* by bushes.

Projecting outwardly from either side of the housing 84*a* are bosses having bushes which fit within the pivot lugs of the bracket 56*a* for rotation of the housing 84*a* with respect to the bracket. The axis of rotation of the pivotal connection between the housing 84*a* and the bracket 56*a* is coaxial with the axis of rotation of the input shaft. The input shaft is the output shaft of the motor 52 or alternatively may be directly coupled to the output shaft of the motor 52. In this way, it becomes possible to fix the motor 52 to the bracket 56*a* whilst permitting the gearbox 70*a* to rotate with respect to the bracket.

The lock-stay 40 and lock-stay actuator 46 of the second embodiment are identical to those of the first embodiment. The lock-stay 40 is coupled between the bracket 56*a* and the housing 84*a* of the gearbox 70*a*, and the actuator 46 is coupled between the bracket 56*a* and the pivotal connection between the lock-links 42, 44 of the lock-stay. The lock-stay/actuator may have one or more locking fingers and/or biasing elements such as those described above for the first embodiment with reference to FIGS. 7-11.

Thus, linear movement of the actuator 46 is converted into rotational movement of the gearbox 70*a* and the drive pinion 60 about the pivotal connection between the housing 84*a* and the bracket 56*a*. The drive system 50 can therefore be rotated between a first position corresponding to a first configuration in which the drive pinion 60 engages the driven gear 20 and a second position corresponding to a second configuration in which the drive pinion 60 is disengaged from the driven gear 20.

By fixing the motor 52 to the bracket 56*a* and using the linear actuator 46 to pivot the gearbox 70*a* with respect to the bracket advantageously reduces the loads on the actuator (positioner) as compared with the drive system of the first embodiment where the motor is fixed with respect to the gearbox so as to move with the gearbox between the engaged and disengaged positions. Also, when in the disengaged position the loads acting on the lock-stay and/or the lock-stay actuator limiting the travel of the gearbox are reduced as compared with the first embodiment. Furthermore, the loads on the biasing element such as a spring for biasing the gearbox into the disengaged position will be lower than for the first embodiment. Therefore the second embodiment advantageously reduces the mass of the drive system that requires rotation between the engaged and disengaged positions, and provides additional freedom in configuring the actuator (e.g. the position of the bearings and axis of rotation) making it easier to optimise bearing loads, actuator loads and driven gear loads.

Whilst in the second embodiment described above the drive path between the input shaft and the output shaft of the gearbox comprises a two stage parallel axis gear arrangement it will be appreciated that other torque transmission arrangements may be used instead. For example, the number of stages may be any number including only a single stage, and the torque transmission may be via a belt/cable or chain instead of gears. It will also be appreciated that the stage(s) of the drive path need not be mounted on parallel axes and skew axis torque transmission arrangements may be used instead.

Also, whilst in the illustrated second embodiment the motor is fixed to the bracket, the motor can alternatively be mounted to rotate relative to the bracket so as to rotate with the gearbox 70*a* about the pivotal connection between the housing 84*a* and the bracket 56*a*. In this case the loads on the actuator (positioner) will still be reduced as compared with the drive system of the first embodiment since the motor axis of rotation is coaxial with the pivotal connection between the housing 84*a* and the bracket 56*a*.

The drive system of the first and second embodiments is suitable for ground taxiing operations, e.g. for driving an aircraft in either forwards or reverse directions. The motor 52 may be a motor-generator operable as either a motor for converting electrical energy into kinetic energy by applying a driving torque to rotate the landing gear wheel, or as a generator for converting kinetic energy of the aircraft into electrical energy by applying a braking torque to the landing gear wheel. The electrical energy generated by the generator is dissipated, e.g. by charging batteries to provide regenerative braking, or as heat. The motor may also be used to provide motorized braking for the landing gear wheel. Although the pinion and wheel gear are referred to as the "drive pinion" and the "driven gear" above, the pinion will actually be driven by the driving wheel gear when the motor-generator is used as a generator.

It will be appreciated that the motor may additionally or alternatively be used for wheel spin-up prior to landing. In some circumstances it may be necessary to provide an alternative drive path and/or a second motor for the wheel spin-up function due to the higher rotational speeds required for wheel spin-up as compared with around taxiing. For example, the wheel 16 may be rotated at speeds of around 175 rpm (equivalent to 20 knots) during ground taxing, while the wheel 16 may be rotated at speeds of around 1400 rpm (equivalent to 160 knots ground speed) prior to touch down on landing.

The drive pinion 60 formed as a roller gear 64 having two co-axial rings of rollers and the driven gear 20 formed as a sprocket 66 having two co-axial rows of sprocket teeth for engaging the respective rings of rollers may be replaced with a roller gear having a single ring of rollers and a pinion having a single sprocket, or any multiple rows of rollers and sprocket teeth, e.g. three or four. Yet further, the driven gear may be formed as a roller chain gear for meshing with a sprocket. The roller chain gear (not shown) may be formed as a roller chain fixed around the outer circumference of an extension ring mounted to the landing gear wheel so that it forms a continuous track around the extension ring. The driven gear may further include a plurality of multiple coaxial chains engagable by a pinion formed by multiple coaxial sprockets.

In each of the arrangements described above the principle of achieving drive via meshing between a sprocket and roller gear/roller chain can be applied when the drive pinion comprises the sprocket and the driven gear (wheel gear) comprises the roller gear/roller chain, and vice versa. Alternatively the drive pinion may be formed as a spur gear or other type of toothed gear, and the driven gear may be formed as a ring gear or other type of toothed gear (not shown).

Although the figures only show features of embodiments of the drive system 50 for driving one of the wheels 16, it is intended that these features may be mirrored for the other wheel 16. That is, it is intended that one drive system 50 may be provided for each wheel 16. For a landing gear 10 with four or more wheels 16, a drive system 50 may be provided for each of the wheels 16, or for only two of them. In embodiments in which only two of the wheels 16 are provided with drive systems 50, it may be necessary to provide further motors (not shown) to achieve pre-landing spin-up of the un-driven wheels, with ground taxiing being accomplished by the two drive systems 50. In other embodiments it may be possible to have one motor 52 shared between two drive systems 50. That is, the motor 52 may be arranged to rotate the input shaft of each drive system.

Although the figures only show features of embodiments where the motor and gearbox of the drive system 50 are supported by a bracket which is rigidly connected to the lower telescopic part 12b (slider)/axle 14 of the landing gear, the drive system 50 may alternatively be mounted on the upper telescopic part 12a (main fitting), The bracket may include an aperture providing access to a jacking point at the base of the slider. Alternatively, the drive system 50 may be mounted on a "grow-out" fitting of the landing gear structure rather than on a separate bracket part.

Although the invention has been described above with reference to one or more preferred embodiments, it will be appreciated that various changes or modifications may be made without departing from the scope of the invention as defined in the appended claims.

The invention claimed is:

1. A drive system for rotating a wheel of an aircraft landing gear, the drive system including
   a motor operable to rotate a drive pinion, and a driven gear adapted to be mounted to the wheel, wherein the drive system has a first configuration in which the drive pinion meshes with the driven gear to permit the motor to drive the driven gear and a second configuration in which the drive pinion does not mesh with the driven gear, the drive system further comprising
   a lock-stay including a first lock link and a second lock link pivotally connected to the first lock link, the lock-stay being switchable between a first position, a second position, and an intermediate position between the first and second positions in which the first and second lock links are substantially aligned, wherein the lock-stay is in the first position when the drive system is in the first configuration and the lock-stay is in the second position when the drive system is in the second configuration, and
   wherein the lock-stay is an over-center lock-stay enabling movement through the intermediate position, wherein the second position of the lock-stay is an over-center position.

2. A drive system according to claim 1, wherein the lock-stay has a first end and a second end, the first end having a pivotal connection with a pivot axis spaced at a fixed distance from an axis of rotation of the driven gear, and the second end having a pivotal connection with a pivot axis spaced at a fixed distance from an axis of rotation of the drive pinion.

3. A drive system according to claim 1, further comprising an actuator coupled to the lock-stay for moving the lock-stay between the first and second positions.

4. A drive system according to claim 3, wherein the actuator is a linear actuator.

5. A drive system according to claim 4, wherein the linear actuator has a first end and a second end, the first end is pivotally connected to the pivotal connection between the first lock link and the second lock link.

6. A drive system according to claim 3, wherein the actuator is a rotary actuator.

7. A drive system according to claim 3, wherein the actuator is a back-driveable actuator.

8. A drive system according to claim 3, wherein the actuator includes a failsafe locking device.

9. A drive system according to claim 4, further comprising a biasing element coupled to the lock-stay for biasing the lock-stay to the second position.

10. A drive system according to claim 9, wherein the biasing element includes at least one spring.

11. A drive system according to claim 10, wherein the spring is a helical coil spring wound around the linear actuator.

12. A drive system according to claim 1, wherein the lock-stay includes a first locking finger, and in the first position the locking finger provides a stop to limit rotation of the first lock link relative to the second lock link about the pivotal connection.

13. A drive system according to claim 1, wherein the lock-stay includes a second locking finger, and in the second position the locking finger provides a stop to limit rotation of the first lock link relative to the second lock link about the pivotal connection.

14. A drive system according to claim 1, further comprising a mechanism for moving the drive system between the first and second configurations, wherein the mechanism is a four bar linkage comprising a ground link, a first grounded link coupled to the ground link by a first revolute joint, a second grounded link coupled to the ground link by a second revolute joint, and a floating link coupled to the first and second grounded links by third and fourth revolute joints respectively, and wherein the lock-stay provides the floating link and the first grounded link of the four bar linkage.

15. A drive system according to claim 14, wherein the second revolute joint of the four bar linkage is spaced at a fixed distance from an axis of rotation of the driven gear and is also spaced at a fixed distance from an axis of rotation of the drive pinion.

16. A drive system according to claim 14, wherein the ground link comprises a mounting bracket for fixing to the landing gear.

17. A drive system according to claim 1, further comprising a drive path between the motor and the drive pinion, the drive path including an input shaft and an output shaft, and wherein the drive pinion is mounted on the output shaft.

18. A drive system according to claim 17, wherein the drive path includes a reduction gear arrangement between the input shaft and the output shaft.

19. A drive system according to claim 18, wherein the reduction gear arrangement is housed within a housing and the lock-stay is pivotally connected to the housing.

20. A drive system according to claim 17, wherein the input shaft is coaxial with the output shaft.

21. A drive system according to claim 17, wherein the input shaft has an axis of rotation spaced from an axis of rotation of the output shaft, and wherein the output shaft is operable to pivot about the axis of rotation of the input shaft.

22. A drive system according to claim 20, wherein the input shaft is coaxial with an axis of rotation of the motor.

23. A drive system according to claim 1, wherein the lock-stay is adapted for movement between the first and second positions in a substantially vertical plane.

24. A drive system according to claim 1, wherein one of the drive pinion and the driven gear includes a sprocket, and the other of the drive pinion and the driven gear includes a roller gear.

25. A drive system according to claim 1, wherein the driven gear is adapted to be mounted to a hub outer rim of the wheel.

26. A drive system according to claim 1, wherein the motor is a motor/generator which, when operating as a generator, is configured to applying a braking torque to the wheel.

27. An aircraft landing gear having a wheel and a drive system according to claim 1, wherein the driven gear is mounted to the wheel.

28. A drive system according to claim 21, wherein the input shaft is coaxial with an axis of rotation of the motor.

29. A drive system according to claim 1, wherein the intermediate position corresponds to the greatest effective length of the lock-stay.

30. A drive system according to claim 1, wherein the intermediate position corresponds to a position in which the pivotally connected first end and second end are furthest apart.

31. A drive system according to claim 1, wherein the intermediate position corresponds to a position in which an external angle between the first and second lock-links is greater than 180 degrees in the first configuration and slightly less than 180 degrees in the second configuration.

32. A drive system for rotating a wheel of an aircraft landing gear, comprising:
a motor operable to rotate a drive pinion,
a driven gear adapted to be mounted to the wheel, wherein the drive system has a first configuration in which the drive pinion meshes with the driven gear to permit the motor to drive the driven gear and a second configuration in which the drive pinion does not mesh with the driven gear,
the drive system further comprising a lock-stay including a first lock link having a first locking finger and a second lock link having a second locking finger,
wherein the first lock link and second lock link are pivotally connected, the lock-stay being switchable between a first position, a second position, and an intermediate position between the first and second positions in which the first and second lock links are substantially aligned,
wherein the lock-stay is in the first position when the drive system is in the first configuration and the lock-stay is in the second position when the drive system is in the second configuration, wherein the first locking finger is configured to bear against a surface of the second lock link in the first configuration, and the second locking finger is configured to bear against a surface the first lock link in the second configuration.

* * * * *